United States Patent [19]
Cho

[11] Patent Number: 6,154,300
[45] Date of Patent: Nov. 28, 2000

[54] WIRELESS DATA COMMUNICATION APPARATUS USING THE DIFFUSED INFRARED-RAY ANTENNA

[75] Inventor: Han-Jin Cho, Seoul, Rep. of Korea

[73] Assignee: SamSung Electronics Co., Ltd., Suwon, Rep. of Korea

[21] Appl. No.: 08/968,944

[22] Filed: Nov. 12, 1997

[30] Foreign Application Priority Data

Nov. 12, 1996 [KR] Rep. of Korea ...................... 96-53525

[51] Int. Cl.[7] .................................................. H04B 10/00
[52] U.S. Cl. ...................... 359/172; 359/152; 359/176; 359/172; 340/825.72
[58] Field of Search .................................. 359/172, 174, 359/176, 152, 145; 340/825–72; 343/725

[56] References Cited

U.S. PATENT DOCUMENTS

| | | | |
|---|---|---|---|
| 4,636,797 | 1/1987 | Saffold et al. ........................ | 343/725 |
| 4,959,874 | 9/1990 | Saruta et al. ............................. | 359/172 |
| 5,383,915 | 1/1995 | Adams ...................................... | 607/60 |
| 5,479,408 | 12/1995 | Will ........................................ | 370/94.1 |
| 5,706,115 | 1/1998 | Hirayama et al. ...................... | 359/172 |

*Primary Examiner*—Kinfe-Michael Negash
*Attorney, Agent, or Firm*—Robert E. Bushnell, Esq.

[57] ABSTRACT

A wireless data communication apparatus using the diffused infrared-ray antennas comprising: a plurality of terminals having their own optical communication modules for transmitting and receiving infrared-ray signals, wherein the optical communication module includes a parabolic shaped infrared-ray antenna; and a repeater which receives the infrared-ray signals transmitted from the plurality of terminals and transmits the infrared-ray signals to the plurality of terminals, wherein the repeater includes a parabolic shaped infrared-ray antenna.

16 Claims, 6 Drawing Sheets

WIRELESS DATA COMMUNICATION APPARATUS USING THE DIFFUSED INFRARED-RAY ANTENNA

CLAIM OF PRIORITY

This application makes reference to, incorporates the same herein, and claims all benefits accruing under 35 U.S.C. §119 from an application entitled Wireless Data Communication Apparatus Using The Diffused Infrared-Ray Antenna earlier filed in the Korean Industrial Property Office on Nov. 12, 1997, and there duly assigned Ser. No. 96-53525 by that Office.

BACKGROUND OF THE INVENTION

1. Field of the Invention

The present invention relates to a wireless data communication apparatus using the diffused infrared-ray antenna, more particularly, to the wireless data communication apparatus which solves the problems of line-of-sight communication and extends a coverage area of the data communication by amplifying a weak signal with a repeater.

2. Description of the Prior Art

The technique of data communication using an infrared ray is generally used in the slow data transmission between computers and its peripheral devices, particularly, in a remote control system of electronic apparatus. However, a conventional infrared-ray communication apparatus is only useful in the short-distance communication and the line-of-sight communication. In the line-of-sight communication system, the first communication module can not communicate with the second communication module unless the second communication module is within a visibility range from the first communication module.

U.S. Pat. No. 5,383,915 to Theodore P. Adams entitled Wireless Programmer/Repeater System For An Implanted Medical Device and U.S. Pat. No. 5,479,408 to Craig A. Will entitled Wireless Personal Paging Communications, And Locating System describe known concepts employing repeaters and antennas in different types of infrared communication systems. The foregoing patents are incorporated by reference herein.

SUMMARY OF THE INVENTION

It is an object of the present invention to provide a wireless data communication apparatus which can overcome the shortcomings of the conventional short-distance and the line-of-sight communication by introducing a repeater for diffusing signals output from a communication module and using a diffused infrared-ray antenna.

To achieve the above object, the present invention includes: a plurality of terminals having their own optical communication modules for transmitting and receiving infrared-ray signals, wherein each optical communication module includes an infrared-ray antenna having a parabolic shape; and a repeater which receives the infrared-ray signals transmitted from one of the plurality of terminals and transmits the infrared-ray signals to other terminals.

In accordance with other embodiment of this invention, an optical communication module comprises: a receiving means for receiving optical infrared-ray signals, and for converting the optical infrared-ray signals into electrical signals; a modem for demodulating the electrical signals output from the receiving means, and for modulating electrical signals output from a control means; the control means for controlling the receipt and transmission of data between the modem and a port of an external device; a transmission means for converting the electrical signals received from the modem to optical infrared-ray signals to transmit the optical infrared-ray signals.

In accordance with another embodiment of this invention, the repeater comprises: a plurality of receiving means for receiving optical infrared-ray signals, and for converting the optical infrared-ray signals into electrical signals; a modem for demodulating the electrical signals output from the receiving means, and for modulating electrical signals output from a control means; a plurality of transmission means for converting the electrical signals of the modem to optical infrared-ray signals to transmit the optical infrared-ray signals to other terminals; and the control means for receiving and transmitting the electrical signals from/to the modem and for analyzing the electrical signals and for selecting one of the plurality of transmission means according to the electrical signals.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will become apparent from a study of the following detailed description with reference to the accompanying drawings.

Figure 1:
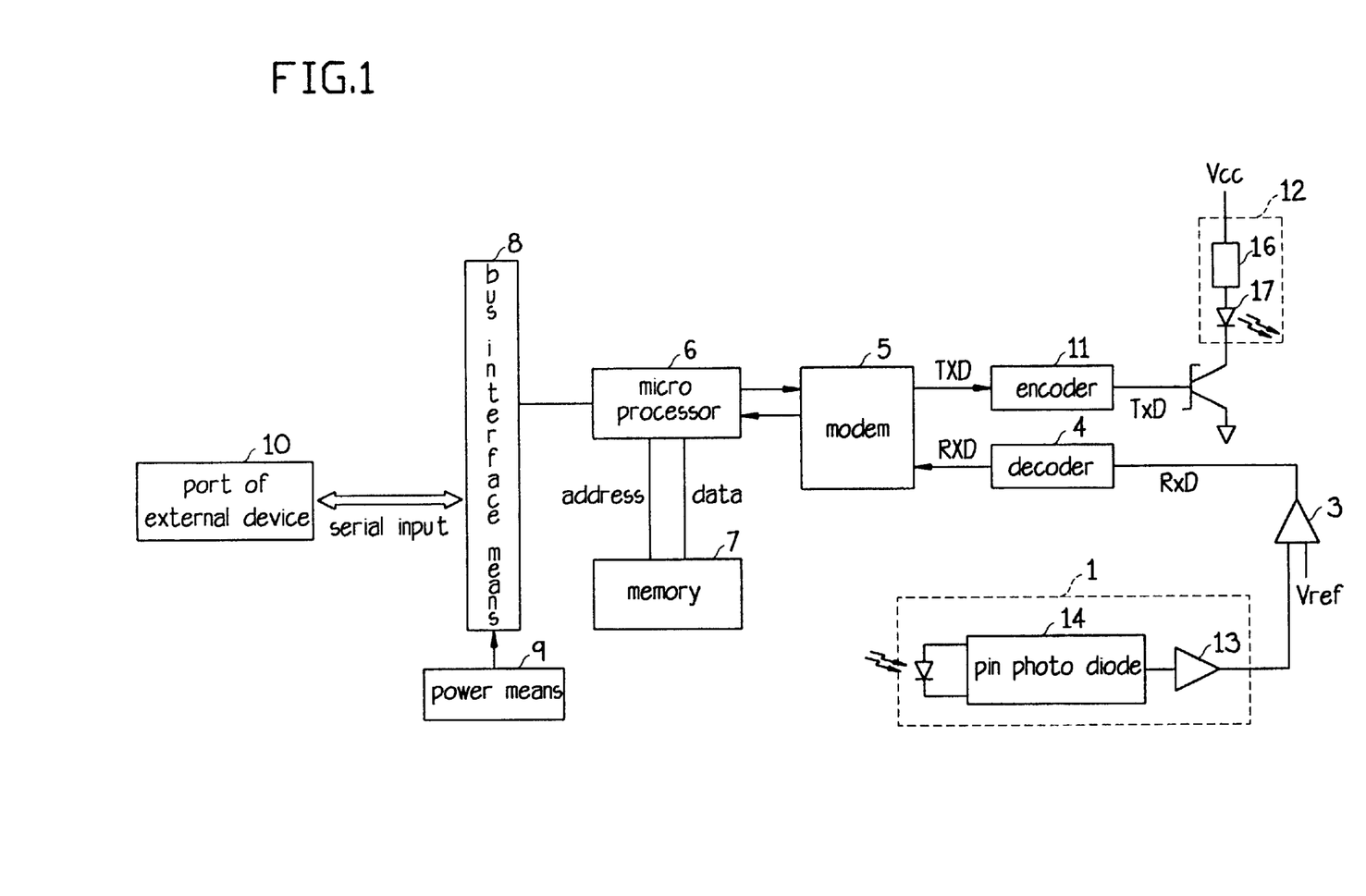
FIG. 1 is a block diagram of an optical communication module in accordance with the preferred embodiment of the present invention.

As shown in FIG. 1, the optical communication module of the preferred embodiment of the present invention utilizes a pin photo diode 14 for receiving optical infrared-ray signals and for converting the optical infrared-ray signals into electrical signals, a pre-amplifier 13 for amplifying the electrical signal output from pin photo diode 14, an operational amplifier 3 for amplifying the output of pre-amplifier 13 to produce signals RxD having a level above the level of a reference voltage Vref and for outputting the amplified signals, a decoder 4 for decoding output signals RxD of operational amplifier 3, a modem 5 for demodulating electrical signals RXD output from decoder 4, and for modulating an electrical signal output from a microprocessor 6. Microprocessor 6 receives and transmits data from/to a port of external device 10 via a bus interface 8, and controls the data transmission operation of the modem 5. The optical communication module also utilizes a bus interface means 8 for interfacing microprocessor 6 and the port of external device 10, and for supplying power from power means 9 to each device of the optical communication module, an encoder 11 for encoding electric signal TXD from the first modem 5, and transmission means 12 for transmitting an output signal TxD of encoder 11. The transmission means 12 includes a bias resistor 16 and infrared emitting diodes 17. The infrared emitting diode 17 and a pin photo diode are used in an infrared antenna system, and are also used in an infrared remote control system which require a high-output and a long-distance data transmission.

Figure 2:
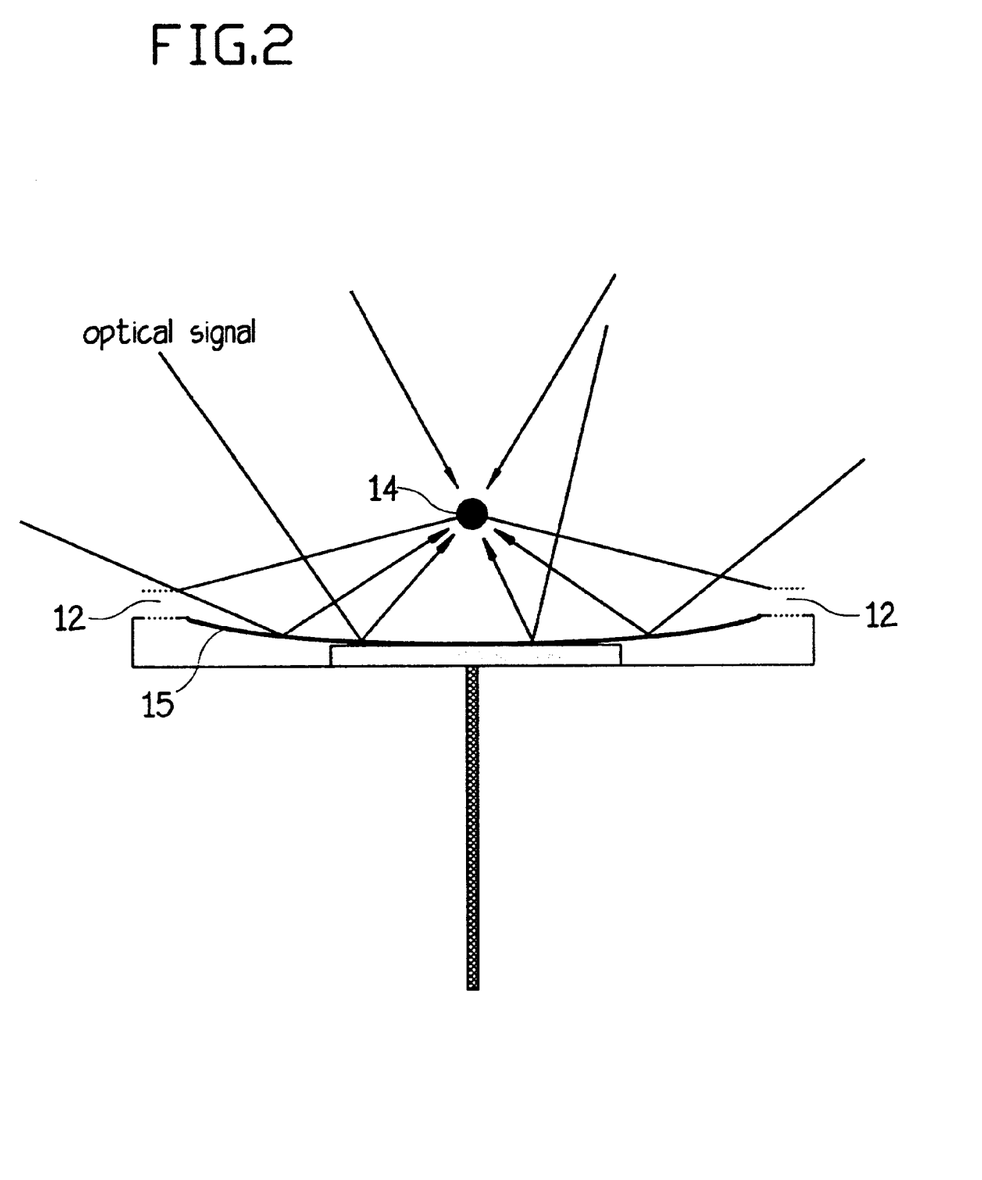
FIG. 2 shows the infrared-ray antenna of the optical communication module according to an embodiment of the present invention.
Figure 4:
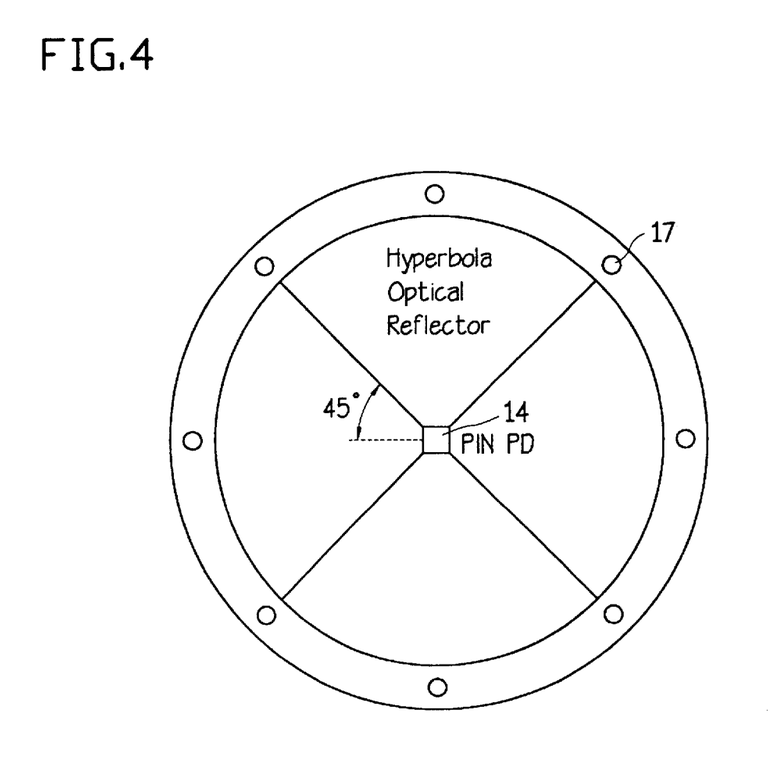
FIG. 4 shows the plan view of the antenna having the hyperbolic optical reflector according to an embodiment of this invention.

FIG. 2 shows an infrared-ray antenna including transmission means 12 and pin photo diode 14. Referring to FIGS. 2 and 4, the antenna has a parabolic shape, transmission means 12 is located adjacent an outer circumferential edge of the antenna and pin photo diode 14 is located at the center portion of the antenna. If the infrared-ray signals reach the antenna, the infrared-ray signals are reflected to pin photo diode 14 by the surface 15 of the antenna.

Figure 3:
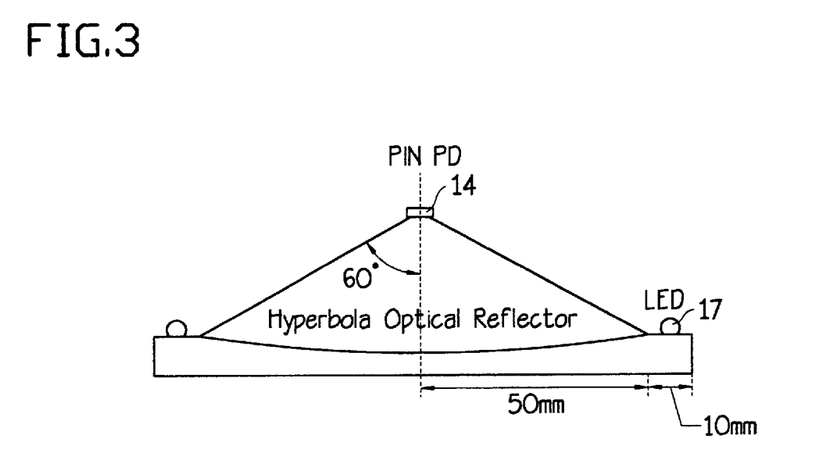
FIG. 3 shows the side view of the antenna having a hyperbolic optical reflector according to an embodiment of this invention.
Figure 5:
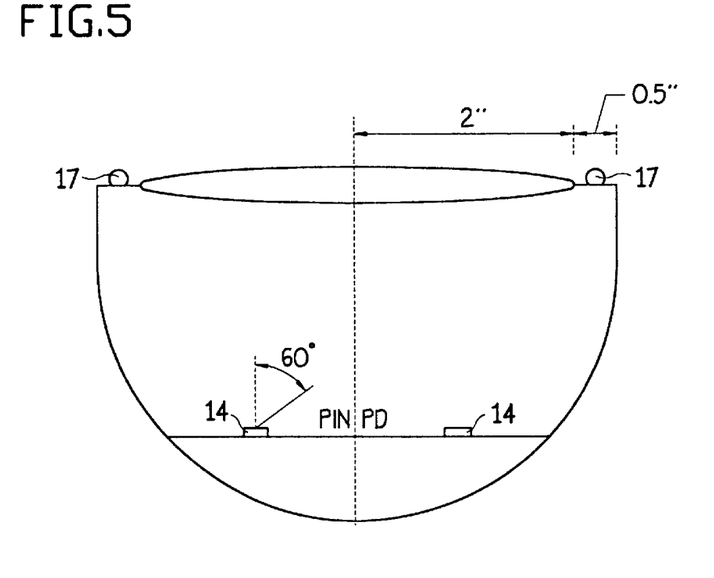
FIG. 5 shows another example of an antenna having a hyperbolic optical reflector according to an embodiment of this invention.
Figure 6:
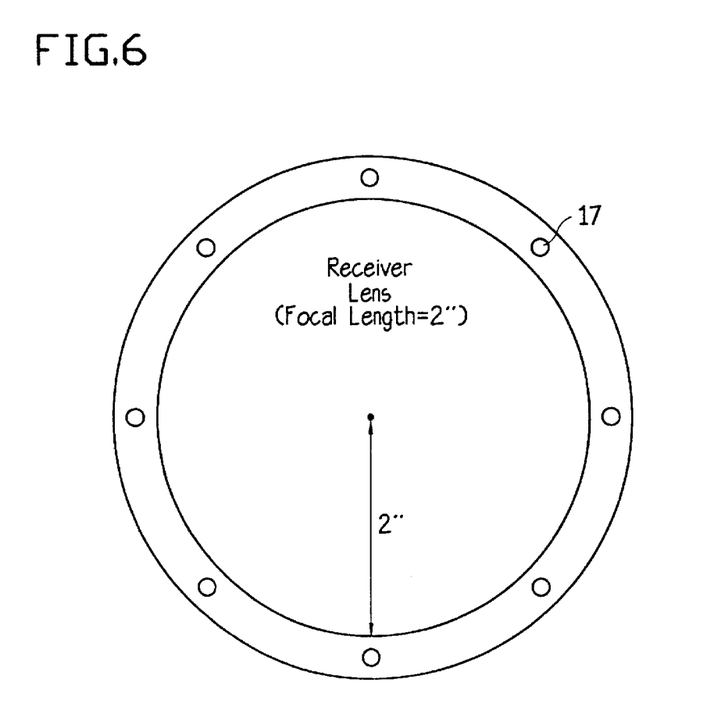
FIG. 6 shows a plan view of a hyperbolic optical reflector according to an embodiment of this invention.

FIG. 3 shows the side view of an antenna having the hyperbolic optical reflector, and FIG. 4 shows the plan view of the antenna having the hyperbolic optical reflector. FIG. 5 shows another example of the antenna having the hyperbola optical reflector, wherein two pin photo diodes 14 are mounted in the antenna, and two infrared emitting diodes 17 of transmission means 12 are mounted on the edge of the antenna. The infrared emitting diode 17 and a pin photo diode are used in an infrared antenna system, and are also used in an infrared remote control system which require a high-output and a long-distance data transmission.

Figure 7:
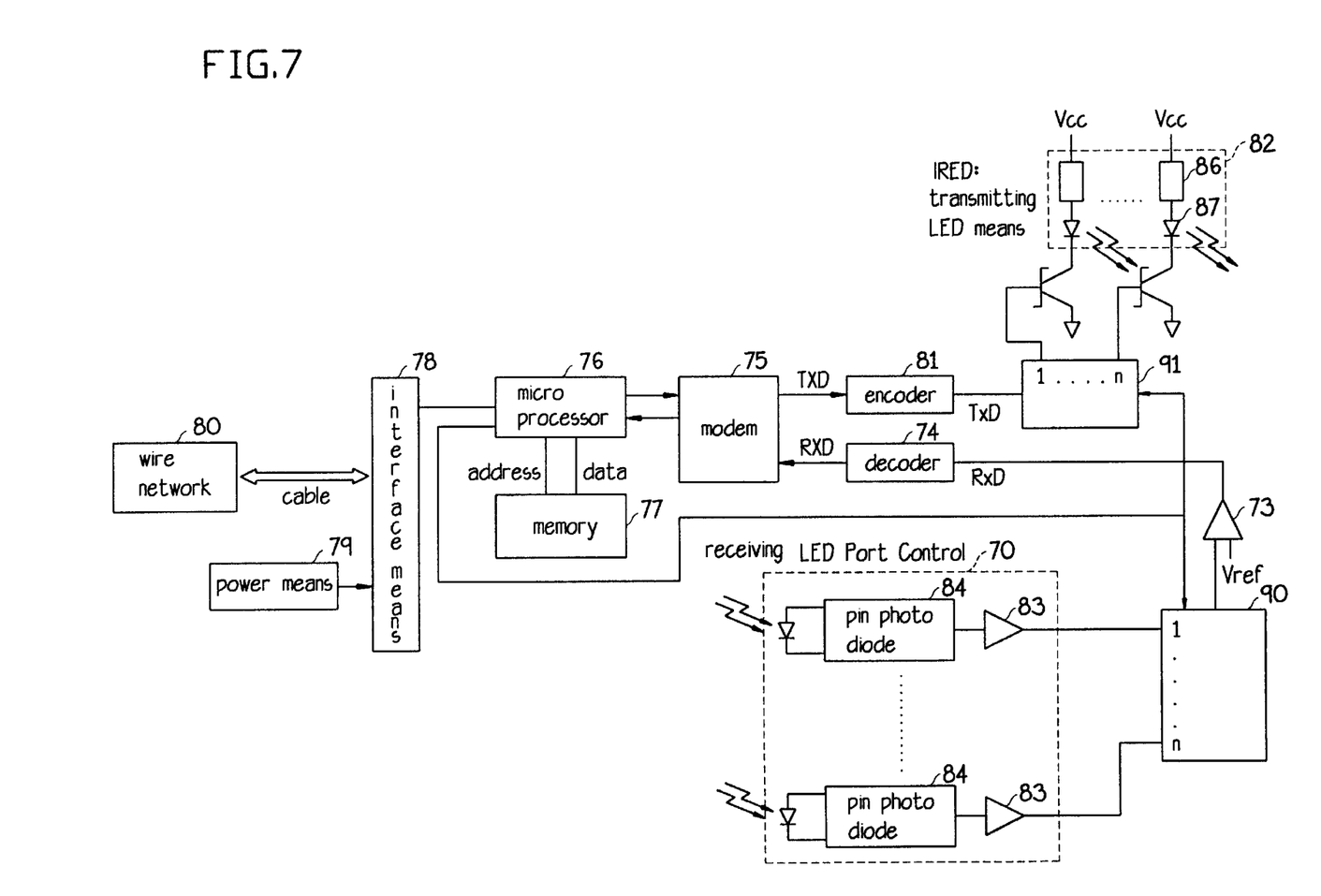
FIG. 7 is a block diagram of a repeater in accordance with the preferred embodiment of the present invention.

As shown in FIG. 7, a repeater utilizes a plurality of receiving means 70 for receiving optical infrared-ray signals and converting the optical infrared-ray signals into electrical signals, a receiving port 90 for selecting a receiving means from the plurality of receiving means 70 and receiving the electrical signals from the selected receiving means; an operational amplifier 73 for amplifying the output of the selected input 1–n of receiving port 90 to a voltage level above a reference voltage Vref and for outputting the amplified signals, a decoder 74 for decoding output signals RxD of operational amplifier 73, a modem 75 for demodulating the electrical signal RXD output from decoder 74 and for modulating electrical signal output from a microprocessor 76, wherein microprocessor 76 receives and transmits data from/to modem 75, an encoder 81 for encoding electric signal TXD output from modem 75 and a plurality of transmission means 82 for transmitting an output signal TxD of encoder 81. Microprocessor 76 is preferably connected to a bus interface 78 for controlling the data transmission between modem 75 and a wire network 80.

The operation of a wireless data communication apparatus using the diffused infrared-ray antenna in accordance with the preferred embodiment of the present invention is as follows. First, the operation of the apparatus is started when the power is supplied to the wireless data communication apparatus be the power means 9. If the user inputs transmission data with a keyboard or an external device, the data is transmitted to microprocessor 6 through bus interface means 8. Microprocessor 6 outputs the data to modem 5, which in turn outputs electric signal TXD to encoder 11 and encoded signal TxD is output to the transmission means 12. The infrared emitting diode 17 of transmission means 12 diffuses the optical signals upon receiving signals TxD from encoder 11.

Then, as shown in FIG. 7, receiving means 70 of the repeater receives and focuses the optical signal to pin-photo diode 14 thereof, and outputs the signal to operational amplifier 73 through receiving port 90. A plurality of the receiving means 70 receive the optical signal from transmission means 12, but receiving port 90 transmits only one of the received signals from one of the receiving means 70 to operational amplifier 73 according to a selection signal from microprocessor 76. Operational amplifier 73 amplifies the signal from receiving port 90 to a voltage level above reference voltage Vref, and outputs the amplified signal RxD to decoder 74. Decoder 74 decodes the signal RxD and transmits the decoded signal RXD to microprocessor 76 through modem 75. Microprocessor 76 receives the signal from modem 75, and analyzes the signal by using a program stored in memory 77, and thereby obtains information such as the terminal which produces the signal, the target terminal of the signal, network ID, and location configuration. Then microprocessor 76 controls the communication between the terminals with the obtained information. If the signal includes data to be transmitted to wire network 80, microprocessor 76 outputs the signal to wire network 80 via interface means 78. And, if the signal includes data to be transmitted to another external terminal, microprocessor 76 outputs the signal to encoder 81 through modem 75. Encoder 81 encodes the electric signal TXD and transmits the electrical signal TxD to transmitting means 82 through transmitting port 91. Transmitting port 91 transmits the signal via one of output ports 1–9 to a selected one of the transmission means 82 according to a selection signal from microprocessor 76. The selected transmission means 82 produces the optical signal by using infrared emitting diode 87.

Figure 8:
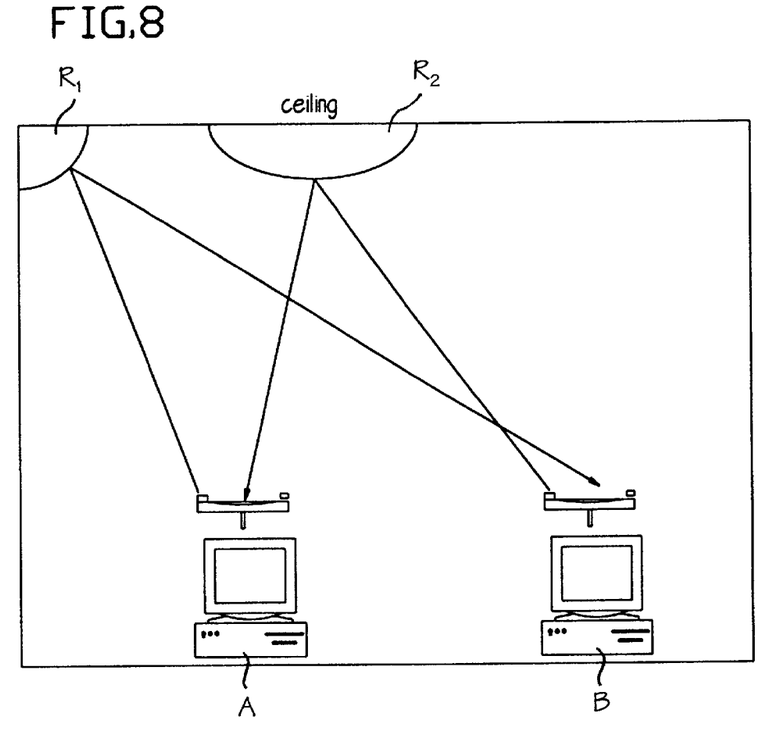
FIG. 8 shows the function of the repeater between two terminals.
Figure 9:
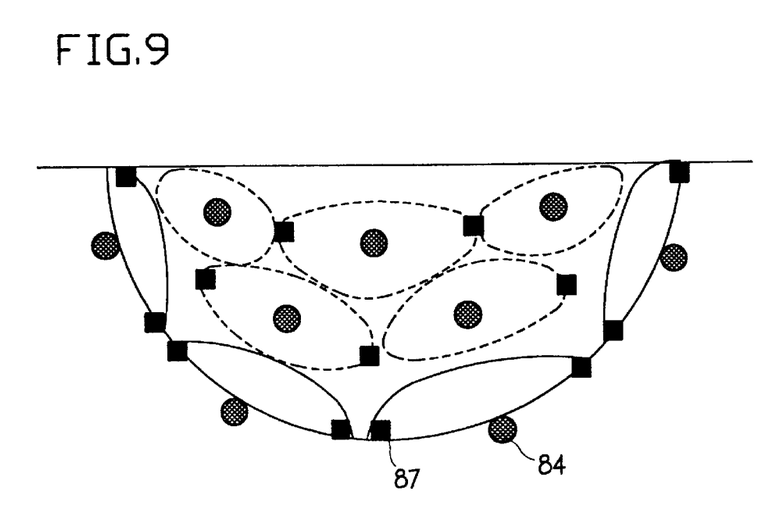
FIG. 9 is an external view of the infrared-ray antennas of the repeater.

FIG. 8 shows the function of the repeater between two terminals. As shown in FIG. 8, infrared-ray signals from one of terminals A and B is transmitted to the other of terminals A and B via one of the repeaters R1 or R2 mounted on the ceiling. And FIG. 9 shows the repeater's infrared-ray antenna having transmission means 87 and pin photo diode 84 of receiving means 70. As shown in FIG. 9, pin photo diode 84 of receiving means 70 and infrared emitting diodes 87 of transmission means 82 are mounted on a parabolic shaped antenna. Referring to FIG. 9, the transmission means 82 are preferably located at the edge of the antenna and the pin photo diode 84 is located at the center portion of the antenna. In the other terminal, pin photo diode 14 receives the infrared-ray signal from transmission means 82. Then, pre-amplifier 13 amplifies an output signal from the pin photo diode 14, and the amplified output signal is again amplified to a level above a reference voltage Vref through operational amplifier 3. The amplified signal RxD output from operational amplifier 3 is decoded by decoder 4 provided to modem 5 as decoded signal RXD and then provided to microprocessor 6. Microprocessor 6 receives the signal from modem 5 and transmits the signal to the port of external device 10 via bus interface 8.

The repeater of this invention receives the infrared ray signal, restores the signal to an original packet, detects the address of the terminal to which the signal should be transmitted, amplifies the signal, and transmits the signal to a destination terminal. Therefore, the repeater can double the coverage area of the infrared-ray communication, and be connected with a conventional wire network.

What is claimed is:

1. A wireless data communication apparatus, comprising:
   a plurality of terminals each having an optical communication module for transmitting and receiving infrared-ray signals, wherein the optical communication module includes an infrared-ray antenna having a parabolic shape and having a hyperbolic optical reflector; and
   a repeater which receives the infrared-ray signals transmitted from one of said plurality of terminals and transmits the infrared-ray signals to another of said plurality of terminals, wherein said repeater includes a plurality of parabolic shaped infrared-ray antennas.

2. The wireless data communication apparatus as set forth in claim 1, said optical communication module comprising:
   infrared-ray signal receiving means for receiving optical infrared-ray signals, and for converting the optical infrared-ray signals into electrical signals;
   a modem for demodulating the electrical signals output from said infrared-ray signal receiving means, and for modulating electrical signals output from a control means;
   said control means for controlling reception and transmission of data between said modem and a port of an external device;
   infrared-ray signal transmission means for converting the electrical signals modulated by said modem to optical infrared-ray signals to transmit the optical infrared-ray signals via said infrared-ray antenna.

3. The wireless data communication apparatus as set forth in claim 2, said infrared-ray signal receiving means and said infrared-ray signal transmission means being mounted on said infrared-ray antenna.

4. The wireless data communication apparatus as set forth in claim 2, said infrared-ray signal transmission means comprising a bias resistor and an infrared emitting diode for transmitting said optical infrared-ray signals.

5. The wireless data communication apparatus as set forth in claim 1, said repeater comprising:
   a plurality of infrared-ray signal receiving means for receiving optical infrared-ray signals, and for converting at least one of said optical infrared-ray signals into an electrical signal;
   a modem for demodulating said electrical signal output from said infrared-ray signal receiving means, and for modulating an electrical signal output from a control means;
   a plurality of infrared-ray signal transmission means, at least one of said transmission means being selected for converting said electrical signals of output from said modem to optical infrared-ray signals to transmit the optical infrared-ray signals to at least one other of said plurality of terminals; and
   said control means for controlling reception and transmission of data from/to said modem and for analyzing said data for selecting said at least one of said plurality of transmission means according to the analysis of said data.

6. The wireless data communication apparatus as set forth in claim 5, said infrared-ray signal receiving means and said infrared-ray signal transmission means being mounted on each of said parabolic shaped infrared-ray antennas of said repeater.

7. The wireless data communication apparatus as set forth in claim 5, wherein each of said infrared-ray transmission means comprises a corresponding bias resistor and a corresponding infrared emitting diode for transmitting the optical infrared-ray signals.

8. The wireless data communication apparatus as set forth in claim 1, wherein each of said parabolic shaped infrared-ray antennas have a corresponding infrared-ray signal receiving means and at least two corresponding infrared-ray signal transmission means mounted thereon.

9. The wireless data communication apparatus as set forth in claim 8, wherein each infrared-ray signal receiving means comprises a pin photo diode for converting a received infrared-ray signal into an electrical signal; and
   each of said infrared-ray signal transmission means comprises an infrared emitting diode for converting an electrical signal into optical infrared-ray signals for transmission.

10. A method for wireless data communication between a plurality of terminals each having an optical communication module for transmitting and receiving infrared-ray signals, said method comprising the steps of:
    converting communication data intended for a target terminal into a modulated electric signal;
    converting said modulated electric signal into an optical infrared-ray signal;
    transmitting said optical infrared-ray signal via an infrared emitting diode mounted on a parabolic shaped infrared-ray antenna;
    receiving said optical infrared-ray signal by utilizing a selected one of a plurality of pin photo diodes mounted on a second parabolic shaped infrared-ray antenna and outputting a received electrical signal from said pin photo diode;
    demodulating said received electrical signal to output received communication data;
    analyzing said received communication data to obtain information regarding said target terminal;
    converting said information into transmission communication data;
    converting said transmission communication data into a second modulated electric signal;
    converting said second modulated electrical signal into a second optical infrared-ray signal; and
    transmitting said second optical infrared-ray signal to said target terminal via a selected one of a plurality of infrared emitting diodes mounted on a parabolic shaped infrared-ray antenna.

11. A wireless data communication apparatus, composing:
    terminal means having an optical communication module for transmitting and receiving infrared-ray signals, wherein the optical communication module includes a parabolic shaped infrared-ray antenna having a hyperbolic optical reflector; and
    repeater means for relaying received infrared-ray signals transmitted from said terminal means to a target terminal, wherein said repeater means includes a plurality of parabolic shaped infrared-ray antennas.

12. The wireless data communication apparatus as set forth in claim 11, said communication module comprising:
    interface means for receiving transmission data from an external source;
    microprocessor means, connected to said interface means, for analyzing said transmission data and outputting said transmission data to a modem;
    said modem outputting modulated data by modulating said transmission data output from said microprocessor means;

an encoder for outputting an encoded electrical signal by encoding said modulated data; and transmission means mounted on said parabolic shaped antenna for outputting an optical infrared-ray signal in response to said encoded electrical signal.

13. The wireless data communication apparatus as set forth in claim 12, said communication module further comprising:

receiving means for receiving an optical infrared-ray signal and outputting an electrical signal, said receiving means being mounted on said parabolic shaped antenna;

amplifying means for amplifying said electrical signal to a level above a predetermined level; and decoder means for decoding the amplified electrical signal for outputting a decoded signal to said modem.

14. The wireless data communication apparatus as set forth in claim 13, wherein said transmission means comprises an infrared emitting diode and a bias resistor connected between a voltage source and a cathode of said infrared emitting diode; and said receiving means comprises a pin photo diode and an amplifier for amplifying an output of said pin photo diode.

15. The wireless data communication apparatus as set forth in claim 11, said repeater means comprising:

reception means for outputting a plurality of electrical signals in response to plural received optical infrared-ray signals;

first selection means for selecting for output one of said plurality of electrical signal;

amplifying means for outputting an amplified electrical signal by amplifying said electrical signal to a level above a predetermined level;

decoder means for outputting a decoded signal by decoding the amplified electrical signal;

a modem for outputting a demodulated signal by demodulating said decoded signal;

a microprocessor for analyzing said demodulated signal to obtain information regarding said target terminal, said microprocessor converting said information into transmission data and outputting said transmission data to said modem;

said modem outputting modulated data by modulating said transmission data output from said microprocessor means;

an encoder for outputting an encoded electrical signal by encoding said modulated data;

plural transmission means mounted on each of said parabolic shaped antennas of said rater means; and second selection means for selectively providing said encoded electrical signal to one of said plural transmission means for outputting an optical infrared-ray signal to said target terminal.

16. The wireless data communication apparatus as set forth in claim 15, wherein each of plural said transmission means comprises an infrared emitting diode and a bias resistor connected between a voltage source and a cathode of said infrared emitting diode; and said reception means comprises a plurality of pin photo diodes and a corresponding amplifier for amplifying an output of a respective one of said pin photo diodes.

* * * * *